United States Patent
Moon et al.

(10) Patent No.: US 6,625,465 B1
(45) Date of Patent: Sep. 23, 2003

(54) BACKWARD CLOSED LOOP POWER CONTROL APPARATUS FOR MOBILE COMMUNICATION SYSTEM AND METHOD USING THE SAME

(75) Inventors: Sung Bae Moon, Kyonggi-Do (KR); Jeong Ho Oh, Kyonggi-Do (KR)

(73) Assignee: Hyundai Electronics Industries Co., Inc., Kyonggi-Do (KR)

( * ) Notice: Subject to any disclaimer, the term of this patent is extended or adjusted under 35 U.S.C. 154(b) by 542 days.

(21) Appl. No.: 09/660,023

(22) Filed: Sep. 12, 2000

(30) Foreign Application Priority Data

Sep. 13, 1999 (KR) ........................................ 1999-39094

(51) Int. Cl.⁷ ................................................ H04B 1/00
(52) U.S. Cl. ........................................ 455/522; 455/69
(58) Field of Search .................... 455/522, 69, 342, 455/343, 232.1, 234.2; 370/318; 375/341, 343, 345

(56) References Cited

U.S. PATENT DOCUMENTS 6,341,224 B1 * 1/2002 Dohi et al. ................. 455/522

\* cited by examiner

*Primary Examiner*—Nay Maung
*Assistant Examiner*—Nick Corsaro
(74) *Attorney, Agent, or Firm*—Lawrence G. Kurland, Esq.; Bryan Cave LLP

(57) ABSTRACT

A backward closed loop power control apparatus for a mobile communication system is disclosed. The apparatus includes a demodulation and PCB extraction unit for receiving a communication frame transmitted from a base station, demodulating the received communication frame and extracting a PCB having an allocated transmission power up or down instruction information, a CRC checking unit for checking a CRC with respect to the communication frame transmitted from the base station, a control unit for outputting a transmission power up or down control signal in accordance with a PCB extracted by the demodulation and PCB extraction unit and a CRC result value checked by the CRC checking unit, and a power adjusting unit for increasing the transmission power of the mobile station to the maximum value of the transmission power and decreasing the transmission power of the mobile station to the minimum value of the transmission power in accordance with a transmission power up or down control signal outputted from the controller, for thereby implementing an economic use of a power of a mobile station by judging a propagation environment of a forward link and backward link based on a CRC(Cyclic Redundancy check) in a mobile station of a mobile communication system which adapts a CDMA method and dynamically performing a backward closed loop power control.

12 Claims, 5 Drawing Sheets

BACKWARD CLOSED LOOP POWER CONTROL APPARATUS FOR MOBILE COMMUNICATION SYSTEM AND METHOD USING THE SAME

BACKGROUND OF THE INVENTION

1. Field of the Invention

The present invention relates to a backward closed loop power control apparatus for a mobile communication system and a method using the same, and in particular to a backward closed loop power control apparatus for a mobile communication system and a method using the same which are capable of dynamically controlling a backward closed loop power control based on a propagation environment of a forward link and a backward link for a mobile station of a mobile communication system using a code division multiple access(CDMA).

2. Description of the Background Art

Generally, in a CDMA mobile communication closed loop power control design, it is preferred to maximize the number of users capable of communicating each other in a certain bandwidth. In this case, it is possible to maximize the capacity of the system by enabling a transmission power of each mobile station to a base station using a minimum signal-to-noise ratio.

At this time, when the transmission power of the mobile station received into the base station is too low, a bit error ratio is increased. In this case, it is impossible to obtain a desired communication quality. If it is too high, the communication quality of the mobile station is good. However, an interference with respect to another mobile station using the same channel is increased, so that the communication quality is decreased without decreasing the number of users.

In addition, in the mobile communication system, a full duplex wireless channel is used, in which channel a frequency bandwidth used for a signal transmission from the base station to the mobile station and a frequency bandwidth used for a signal transmission from the mobile station to the base station are different. The above-described frequency bandwidth division implements the use of the mobile station transmitter and receiver at the same time without any feedback or interference of the mobile station transmission signal with respect to the mobile station receiver. In addition, the above-described operation greatly affects the power control operation.

In the case of a 45 MHz frequency bandwidth division between the forward link and the backward link, it exceeds a coherence bandwidth of the channel, the loss in a multiple path of the forward link measured in the mobile station is different from the loss in the multiple path of the backward link. In this case, it is assumed that the above-described losses are same since it is impossible to measure the loss of the multiple path of the backward link in the base station.

In the above-described multiple path loss measuring method, an accurate average value with respect to the transmission power is provided. At this time, in order to prevent a Rayleigh fading phenomenon having the different characteristics between both paths, a certain correction method is needed. Namely, the mobile station estimates the signal power from the base station in order to compensate an independent Rayleigh fading phenomenon of the backward link and the forward link.

In other words, the signal-to-noise of the signal received from each mobile station in a demodulator of the base station is measured, and the thusly measured signal-to-noise ratio is compared with a previously set reference signal-to-noise ratio, and a transmission power control instruction is transmitted to the mobile station through the forward channel based on a result of the comparison.

The transmission power control instruction is used to determine the transmission power of the mobile station together with the transmission power estimation value of the open loop method of the mobile station, and the transmission power of the mobile station is increased or decreased by the unit of 1 db in accordance with the instruction transmitted at every 1.25 ms, and it is possible to trace the Rayleigh fading of the backward link.

Here, it is important to decrease the time required for the determination step of the transmission power control instruction and the transmission step of the instruction so that the channel environment is not changed until a control bit is received in the mobile station, and an actual control operation is performed.

In the system controller of the switch station of the mobile communication system, the signal-to-noise ratio is provided to the controller of the base station based on the error ratio of each mobile station, and the signal-to-noise ratio is transferred to the channel controller and is used for a up or down of the transmission power of each mobile station.

The above-described operation is called as a backward closed loop power control method.

The power control operation of the conventional CDMA mobile communication system is performed when a call is connected between the mobile station and the base station. The above-described power control is classified into a forward power control in which a communication frame from the base station and the mobile station is maintained at a certain degree, and a backward power control in which a communication frame from the mobile station to the base station is maintained at a certain degree.

The backward closed loop power control method for a conventional mobile communication system in the above-described power controls will be explained with reference to FIG. 1.

First, the base station receives a communication frame transmitted from the mobile station in a communication frame receiving step S1, and a signal-to-noise ratio is analyzed at every 1.25 ms with respect to the communication frame received in the step SI in a signal-to-noise ratio analyzing step S2.

In a signal-to-noise ratio analyzing step S3, the signal-to-noise ratio analyzed in the step S2 is compared with a previously set reference signal-to-noise ratio. As a result of the comparison of the signal-to-noise ratio comparison step S3, if the signal-to-noise ratio analyzed in the step S2 is smaller than the reference signal-to-noise ratio, a transmission power up instruction is transmitted to the mobile station in a transmission power up instruction transmission step S4, and in a transmission power up step S5, the transmission power of the mobile station is manually increased by 1 dB based on the transmission power up instruction of the step S4.

As a result of the comparison of the signal-to-noise ratio comparison step S3, the signal-to-noise ratio analyzed in the step S2 is larger than the previously set reference signal-to-noise ratio, in a transmission power down instruction transmission step S6, a transmission power down instruction is transmitted to the mobile station, and in a transmission power down step S7, the transmission power of the mobile station is manually decreased by 1 dB based on a transmission power down instruction of the step S6.

In the above-described conventional backward closed loop power control method for a mobile communication system, the transmission power of the mobile station is increased or decreased by the fixed unit of 1 dB in accordance with the transmission power up or down instruction transmitted from the base station.

Therefore, in the backward closed loop power control method for a mobile communication system, in the case that the base station is installed at a bad environment location, since the power amount increased in the mobile station is fixed, the communication quality of the mobile station is decreased, and in the case that the mobile station is installed at a portion in which the propagation environment is bad, since the down amount of the transmission power of the mobile station is constantly fixed, a propagation interference may occur in another mobile station.

SUMMARY OF THE INVENTION

Accordingly, it is an object of the present invention to provide a backward closed loop power control apparatus for a mobile communication system and a method using the same which are capable of implementing an economic use of a power of a mobile station by judging a propagation environment of a forward link and backward link based on a CRC(Cyclic Redundancy check) in a mobile station of a mobile communication system which adapts a CDMA method and dynamically performing a backward closed loop power control.

To achieve the above object, there is provided a backward closed loop power control apparatus for a mobile communication system which comprises a demodulation and PCB extraction unit for receiving a communication frame transmitted from a base station, demodulating the received communication frame and extracting a PCB having an allocated transmission power up or down instruction information, a CRC checking unit for checking a CRC with respect to the communication frame transmitted from the base station, a control unit for outputting a transmission power up or down control signal in accordance with a PCB extracted by the demodulation and PCB extraction unit and a CRC result value checked by the CRC checking unit, and a power adjusting unit for increasing the transmission power of the mobile station to the maximum value of the transmission power and decreasing the transmission power of the mobile station to the minimum value of the transmission power in accordance with a transmission power up or down control signal outputted from the controller.

To achieve the above objects, there is provided a backward closed loop power control method for a mobile communication system in a backward closed loop power control method of a mobile station in a CDMA mobile communication system for controlling a transmission power of a mobile station in accordance with a transmission power up or down instruction of a base station, which method comprises a communication frame receiving step in which the mobile station receives a communication frame including a PCB having an allocated transmission power up or down instruction information, a PCB extraction step for demodulating a communication frame received in the communication frame receiving step and extracting the PCB, a CRC checking step for checking the CRC with respect to the communication frame received in the communication frame receiving step after the PCB extraction step, and a transmission power control step for increasing or decreasing the transmission power of the mobile station by a previously set value based on the value of the PCB extracted in the PCB extraction step and the CRC result value checked in the CRC checking step.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The backward closed loop power control apparatus for a mobile communication system according to the present invention will be explained with reference to the accompanying drawings.

Figure 1:
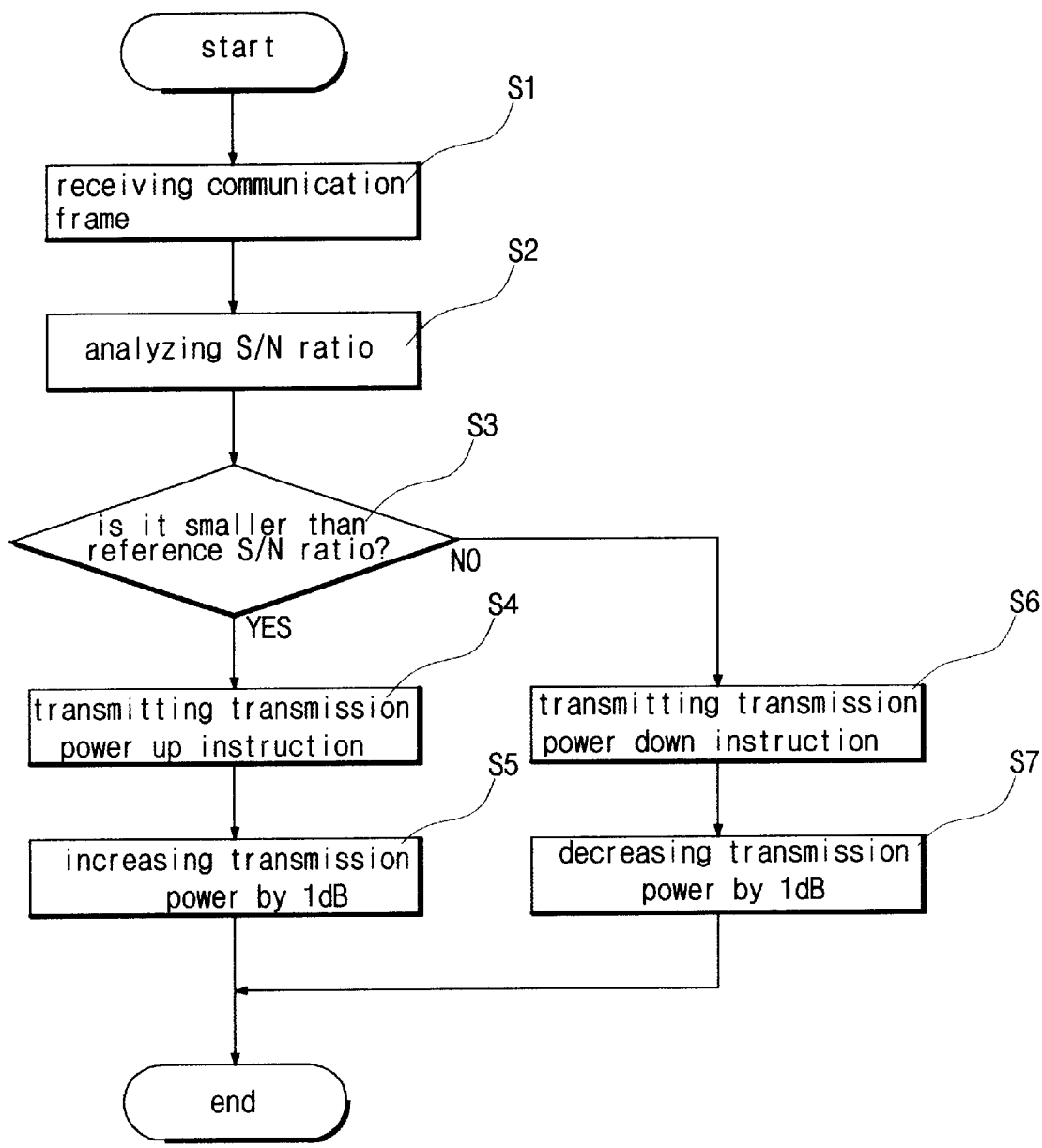
FIG. 1 is a flow chart of a conventional backward closed loop power control method of a mobile communication system.
Figure 2:
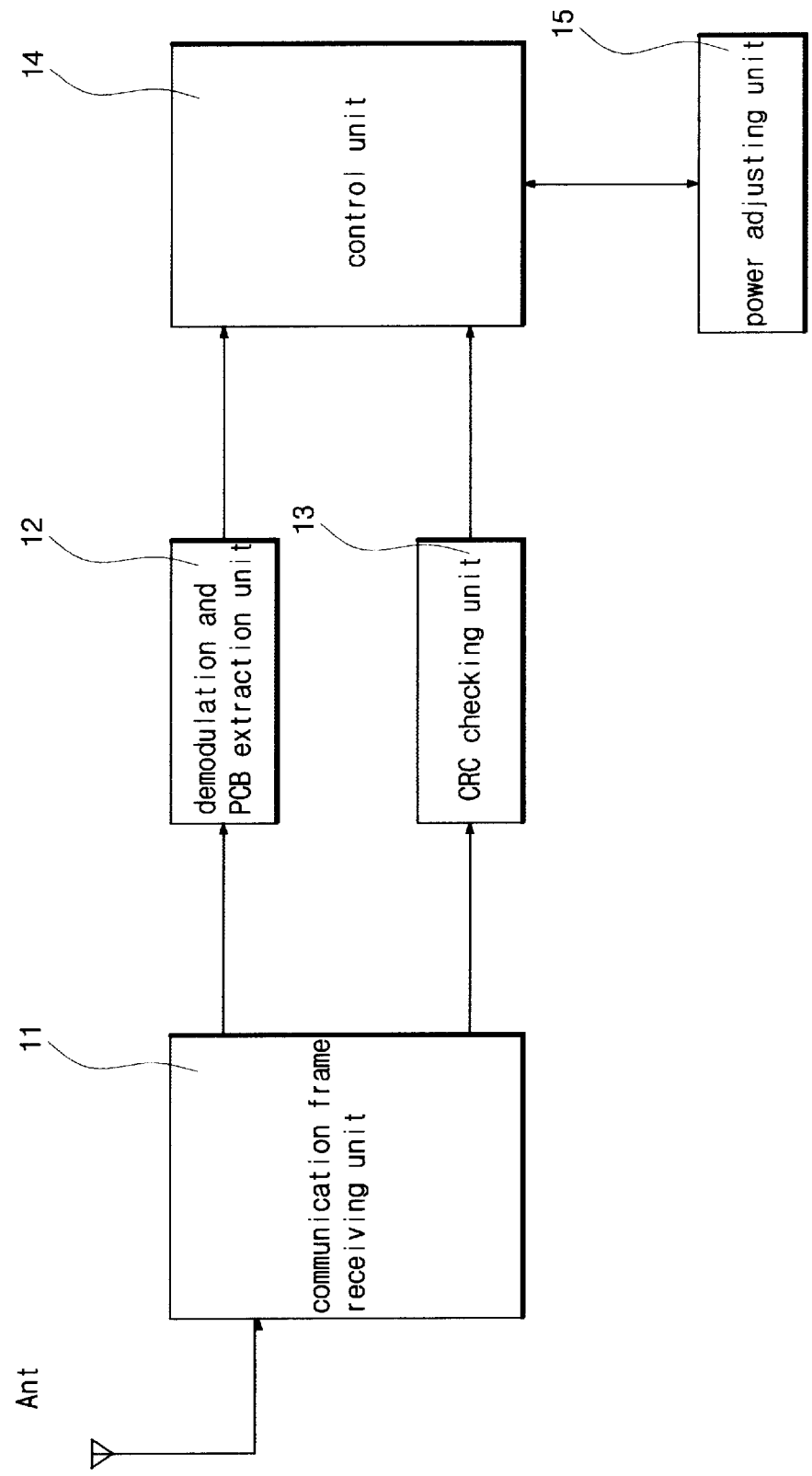
FIG. 2 is a view illustrating a backward closed loop power control apparatus for a mobile communication system according to the present invention.

FIG. 2 is a view illustrating a backward closed loop power control apparatus for a mobile communication system according to the present invention which includes a communication frame receiving unit 11 for receiving a communication frame including an allocated transmission power up and down instruction information transmitted from a base station(not shown), a demodulation and PCB extraction unit 12 for demodulating the communication frame received from the communication frame receiving unit 11 and extracting the PCB, a CRC checking unit 13 for checking a CRC with respect to the communication frame received from the communication frame receiving unit 11 a control unit 14 for outputting a transmission power up or down control signal based on a PCB extracted by the demodulation and PCB extraction unit 12 and a result of the CRC checked by the CRC checking unit 13, and a power adjusting unit 15 for increasing or decreasing the transmission power of the mobile station in accordance with the transmission power up or down control signal outputted from the control unit 14.

In the backward closed loop power control apparatus for a mobile communication system according to the present invention, in the case that the signal-to-noise ratio of the communication frame transmitted from the mobile station is smaller than a previously set reference signal-to-noise ratio, the base station allocates "0", which is an instruction information for increasing the transmission power of the mobile station, to the PCB and transmits the communication frame to the mobile station, and in the case that the signal-to-noise ratio of the communication frame is larger than the previously set reference signal-to-noise ratio, the base station allocates "1", which is an instruction information for decreasing the transmission power of the mobile station, to the PCB and transmits the communication frame to the mobile station.

The communication frame receiving unit 11 receives a communication frame transmitted from the base station and demodulates the communication frame received through the demodulation and PCB extraction unit 12 and checks the, CRC with respect to the communication frame received through the CRC checking unit 13.

The control unit 14 outputs a control signal for increasing the transmission power by the UP value to the power adjusting unit 15 in the case that the value of the PCB extracted by the demodulation and PCB extraction unit 12 is "0" and the CRC result value checked by the CRC checking unit 13 is "1" and outputs a control signal for increasing the transmission power by the BIG-UP value to the control signal in the case that the value of the PCB is "0" and the CRC result value is "0".

In addition, in the case that the value is the PCB is "1" and the CRC result value is "1", a control signal for decreasing the transmission power by the previously set BIG-DOWN value is outputted to the power adjusting-unit 15, and in the case that the value of the PCB is "1" and the CRC resultant value is "0", a control signal for decreasing the transmission power by the previously set DOWN value is outputted to the power adjusting unit 15.

In the case that the CRC result value is "1" and the CRC check result value is proper, namely, in the case that an error is not checked, and when the CRC result value is "0", namely, in the case that the CRC check result value is not proper, namely, when an error is checked, the BIG-UP value represents a value larger than the UP value, and the BIG-DOWN value represents a value larger than the DOWN value.

The power adjusting unit 15 adjusts a transmission power of the mobile station for the maximum or minimum value of the previously set transmission power in accordance with a transmission power up or down control signal outputted from the control unit 14.

Figure 3:
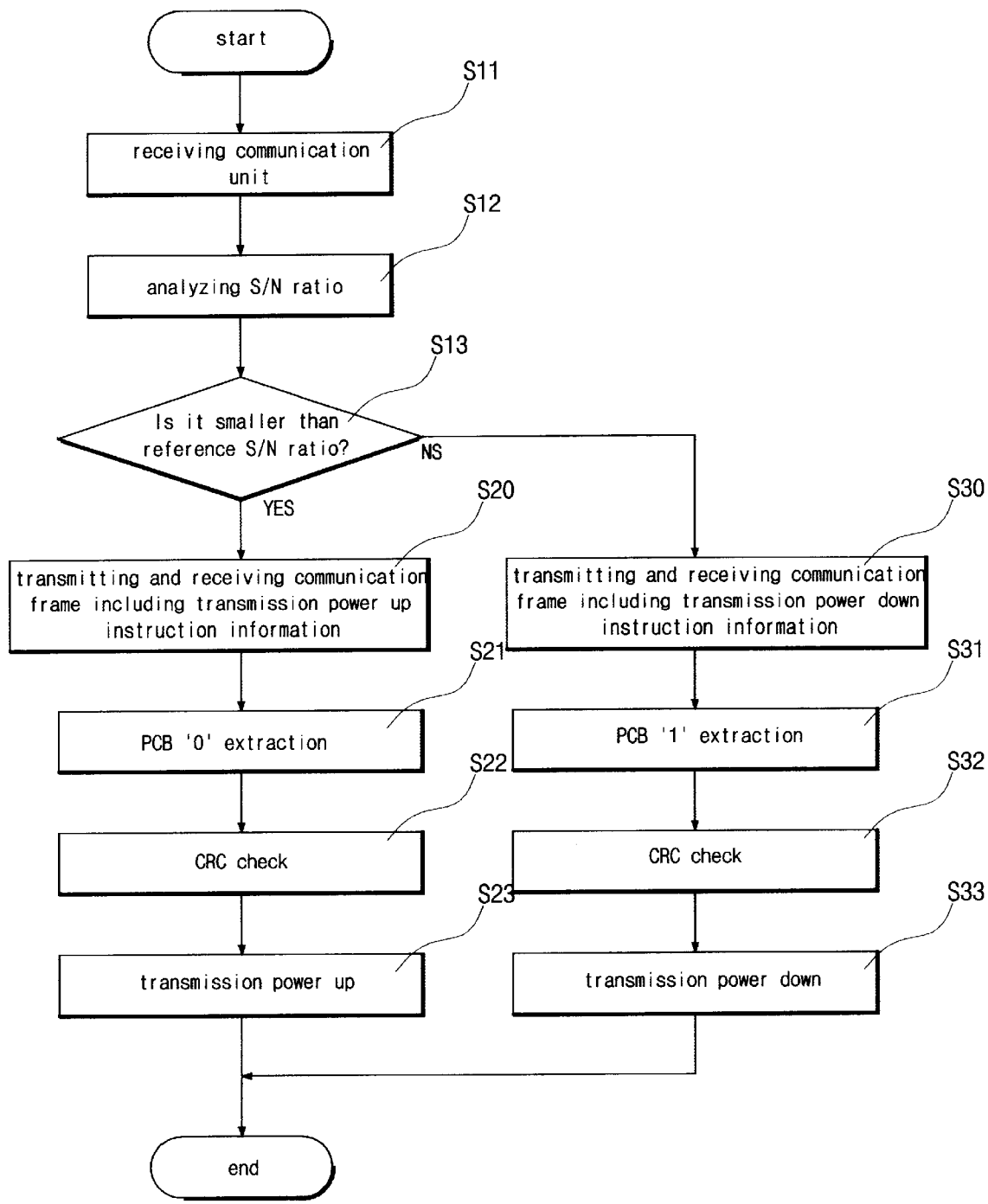
FIG. 3 is a flow chart of a backward closed loop power control method for a mobile communication system according to the present invention.

The operation of the backward closed loop power control apparatus for a mobile communication system according to the present invention will be explained with reference to FIGS. 3 through 5.

In a communication frame receiving step S11, the base station receives a communication frame from the mobile station, and in a signal-to-noise ratio analyzing step S12, the signal-to-noise ratio is analyzed for each power control group of 1.25 ms with respect to the communication frame received in the step S11.

In a signal-to-noise ratio comparison step S13, the signal-to-noise ratio analyzed in the step S12 is compared with a previously set reference signal-to-noise ratio for obtaining a constant backward communication quality.

As a result of the comparison of the signal-to-noise comparison step S13, if the signal-to-noise ratio analyzed in the step S12 is smaller than the previously set reference signal-to-noise ratio, in a communication frame transmission and receiving step S20, the value "0" which is a transmission power up instruction information for increasing the transmission power of the mobile station is allocated to the PCB for maintaining a constant communication quality in the backward link, and the communication frame including the PCB is transmitted to the mobile station, and the mobile station receives a communication frame including a transmission power up instruction information.

At this time, in the case that the signal-to-noise ratio analyzed in the step S12 is smaller than the previously set reference signal-to-noise ratio, the error is increased.

Therefore, the transmission power of the mobile station must be increased for obtaining a constant communication quality in the backward link.

Namely, the communication frame receiving unit 11 of the mobile station receives a communication frame including the PCB having an allocated value of "0" which is a transmission power up instruction information transmitted from the base station.

In a PCB "0" extraction step S21, the mobile station receives a communication frame from the base station and demodulates the same for thereby extracting the PCB.

Namely, the demodulation and PCB extraction unit 12 demodulates the communication frame received from the communication frame receiving unit 11 for thereby extracting "0" which is a transmission power up instruction information allocated to the PCB.

In a CRC checking step S22, the CRC checking unit 13 checks the CRC with respect to the communication frame received from the communication frame receiving unit 11.

At this time, the state of the CRC check result value of the step S22 is judged to be good or bad. It is assumed that the value of "1" is represents a good value, and the value of "0" is a bad value.

In a transmission power up step S23, the mobile station increases the transmission power of the mobile station in accordance with "0" of the PCB extracted in the step S21 and the CRC result value checked in the step S22.

The control unit 14 receives "0" of the PCB extracted by the demodulation and PCB extraction unit 12 and the CRC result value checked by the CRC checking unit 13 and increases the transmission power of the mobile station. Namely, in the case that the value of the PCB extracted by the demodulation and PCB extraction unit 12 is "0" and the CRC result value checked by the CRC checking unit 13 is "1", a control signal is outputted to the power adjusting unit 15 for increasing the transmission power by the previously set UP value, and in the case that the value of the PCB is "0" and the CRC result value is "0", a control signal is outputted to the power adjusting unit 15 for increasing the transmission power by the BIG-UP value larger than the UP value for thereby increasing the transmission power of the mobile station by the power adjusting unit 15.

As a result of the comparison in the signal-to-noise ratio comparison step S13, if the signal-to-noise ratio analyzed in the step S12 is larger than the previously set reference signal-to-noise ratio, in a communication frame transmission and receiving step S30, "1" which is a transmission power down instruction information is allocated to the PCB for decreasing the transmission power of the mobile station for maintaining a constant communication quality in the backward link including the transmission power down instruction information, and the communication frame including the PCB is transmitted to the mobile station, and the mobile station receives a communication frame including the transmission power decreasing instruction information.

At this time, in the case that the signal-to-noise ratio analyzed in the step S12 is larger than the previously set reference signal-to-noise ratio, the error is decreased, so that it is possible to maintain a proper communication quality. In this case, since a constant communication quality must be maintained in the backward link, the transmission power of the mobile station must be decreased.

Namely, the communication frame receiving unit 11 of the mobile station receives a communication frame including the PCB having an allocated information of "1" which is a transmission power down instruction information transmitted from the base station.

In a PCB "1" extraction step S31, the mobile station receives and demodulates a communication frame from the base station and extracts the PCB.

Namely, the demodulation and PCB extraction unit 12 demodulates the communication frame received in the communication frame receiving unit 11 and extracts the value is "1" which is the transmission power down instruction information allocated to the PCB.

In a CRC checking step S32, the CRC checking unit 13 checks the CRC with respect to the communication frame received in the communication frame receiving unit 11.

In a transmission power down step S33, the mobile station decreases the transmission power of the mobile station in accordance with "1" of the PCB extracted in the step S31 and a CRC result value checked in the step S32.

The control unit 14 receives "1" of the PCB extracted by the demodulation and PCB extraction unit 12 and a CRC result value checked by the CRC checking unit 13 and decreases the transmission power of the mobile station. Namely, in the case that the value of the PCB extracted by the demodulation and PCB extraction unit 12 is "1" and the CRC result value checked by the CRC checking unit 13 is "1", a control signal is outputted to the power adjusting unit 15 for decreasing the transmission power by the previously set BIG-DOWN value, and in the case that the value of the PCB is "1" and the CRC result value is "0", a control signal is outputted to the power adjusting unit 15 for decreasing the transmission power by the DOWN value which is smaller than the BIG-DOWN value for thereby decreasing the transmission power of the mobile station using the power adjusting unit 15.

Here, the operations of the transmission power up step S23 and the transmission power down step S33 will be explained with reference to FIGS. 4 and 5.

Figure 4:
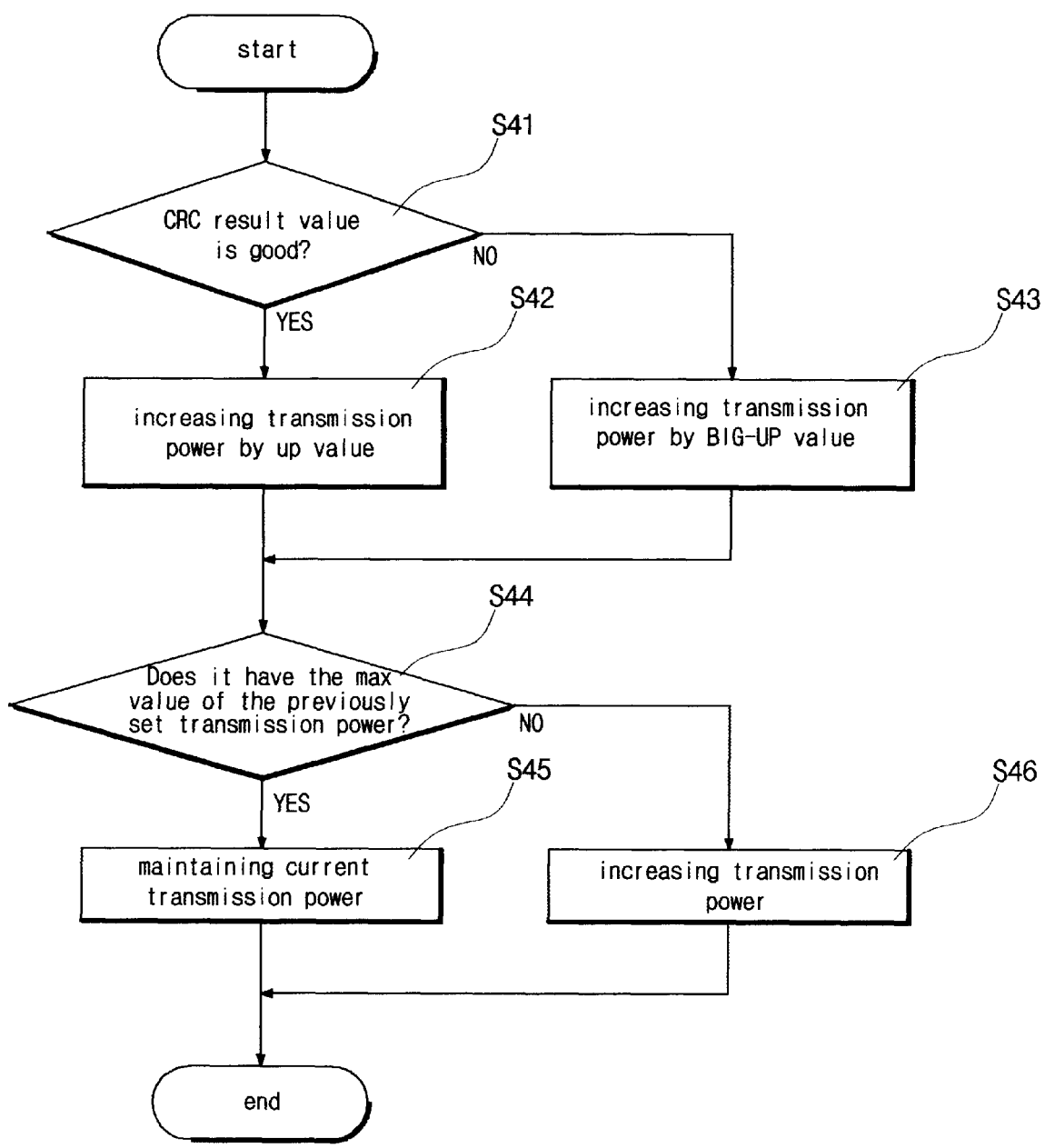
FIG. 4 is a flow chart of an operation of a transmission power up step of FIG. 3 according to the present invention.

As shown in FIG. 4, in a CRC checking result value checking step S41, it is checked whether the CRC result value checked in the CRC check step S22 is proper as "1".

In the case that the CRC result value is proper in the CRC check result value checking step S41, the routine is proceeded to a transmission power up step S42 of the UP value unit, and the transmission power of the mobile station is increased by the UP value.

Namely, in the case that the value of the PCB extracted by the PCB "0" extraction step S21 is "0", and the CRC result value checked in the CRC check result value checking step S41 is "1", the control unit 14 judges that the propagation environment of the backward link is bad, and the propagation of the forward link is good, and a control signal is outputted to the power adjusting unit 15 for increasing the transmission power by the UP value for thereby increasing the transmission power of the mobile station.

In the case that the CRC result value is bad in the CRC check result value checking step S41, the routine is proceeded to a transmission power up step S43 of a BIG-UP value unit, and the transmission power of the mobile station is increased by the previously set BIG-UP value.

Namely, in the case that the value of the PCB extracted in the PCB "0" extraction step S21 is "0", and the CRC result value checked in the CRC check result value checking step S41 is "0", the control unit 14 judges that the propagation environment of the forward link is bad, and a control signal is outputted to the power adjusting unit 15 for increasing the transmission power by the BIG-UP value for thereby increasing the transmission power of the mobile station.

In a transmission power maximum value comparison step S44, the control unit 14 judges whether the transmission power of the mobile station increased in accordance with the UP value or BIG-value has the maximum value of the previously set transmission power.

As a result of the comparison of the transmission power maximum value comparison step S44, in the case that the transmission power of the mobile station increased in the steps S42 and S43 has the maximum value of the previously set transmission power, the routine is advanced to the current transmission power maintaining step S45 for thereby constantly maintaining the transmission power of the current mobile station, and if the transmission power of the mobile station increased in the steps S42 and S43 does not have the maximum value of the previously set maximum value, the routine is proceeded to a transmission power up step S46, and the transmission power is increased until the transmission power of the mobile station has the maximum value of the previously set transmission power in accordance with a control signal for increasing the transmission power by the UP value or BIG-UP value outputted from the control unit 14.

Figure 5:
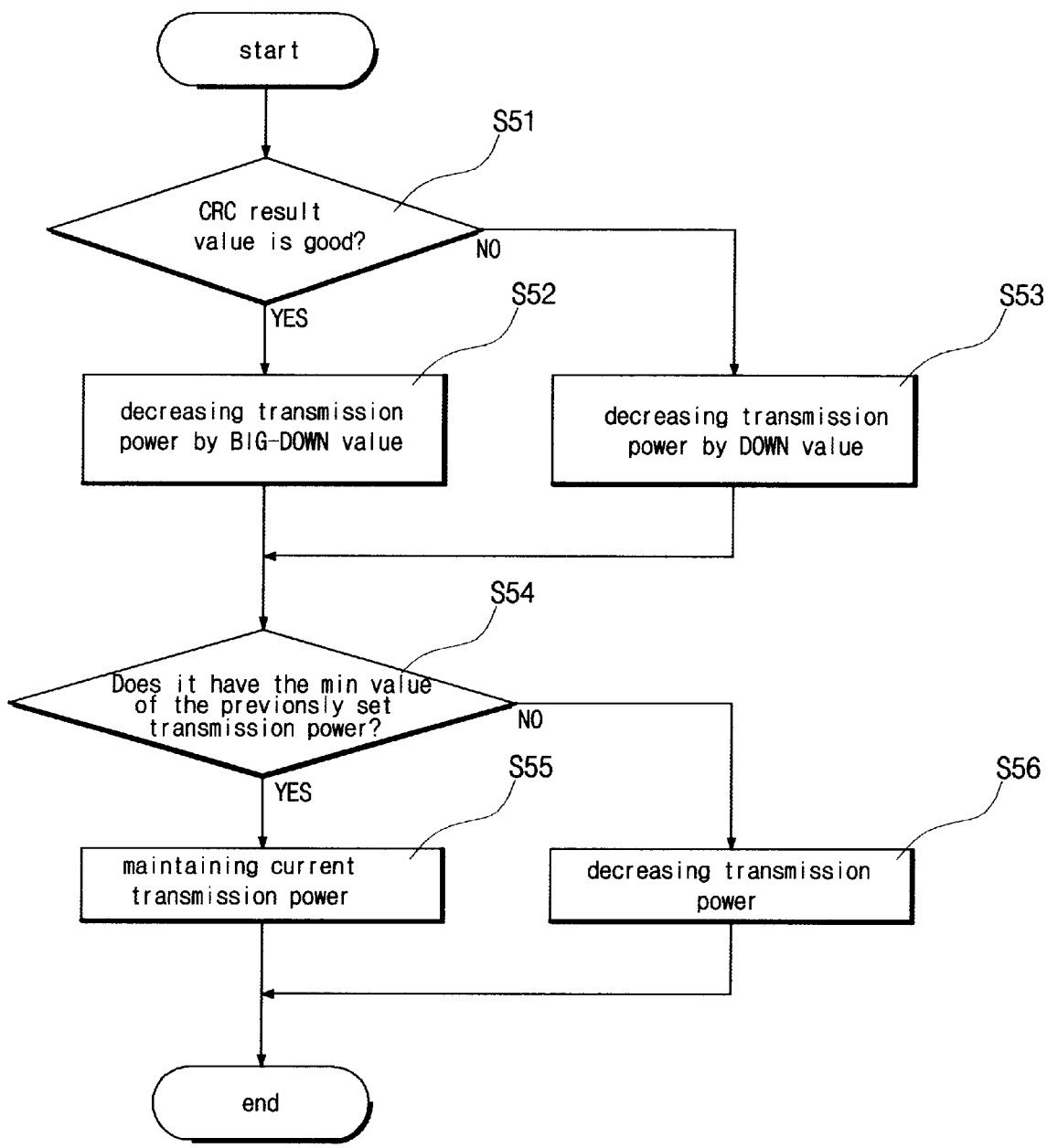
FIG. 5 is a flow chart of an operation of a transmission power down step of FIG. 3 according to the present invention.

In addition, as shown in FIG. 5, in a CRC check result value checking step S51, it is checked whether the CRC result value checked in the CRC checking step S32 is proper as "1".

As a result of the check of the CRC check result value checking step S51, if the CRC result value is proper, a transmission power down step S52 of the BIG-DOWN value unit is performed, and the transmission power of the mobile station is decreased by the previously set BIG-DOWN value.

Namely, in the case that the value of the PCB extracted in the PCB "0" extraction step S31 is "1" and the CRC result value checked in the CRC check result value checking step S51 is "1", the control unit 14 judges that the mobile station transmits too high signal power in the backward link, and the propagation environment of the forward link is bad and outputs a control signal to the power adjusting unit 15 for decreasing the transmission power by the BIG-DOWN value for thereby decreasing the transmission power of the mobile station.

As a result of the check in the CRC check result value checking step S51, if the CRC result value is bad, the routine is proceeded to a down value unit transmission power down step S53 for thereby decreasing the transmission power of the mobile station by the down value.

Namely, in the case that the value of the PCB extracted in the PCB "0" extraction step S31 is "1", and the CRC result value checked in the CRC check result checking step S51 is "0", the control unit 14 judges that the power transmitted through the backward link is high and the propagation environment of the forward link is good and outputs a control signal to the power adjusting unit 15 for decreasing the transmission power by the DOWN value for thereby decreasing the transmission power of the mobile station.

In a transmission power minimum value comparison step S54, the control unit 14 judges whether the transmission power of the mobile station decreased in accordance with the BIG-DOWN or DOWN value in the steps S52 and S53 has the minimum value of the previously set transmission power.

As a result of the comparison of the transmission power minimum value comparison step S54, if the transmission power of the mobile station decreased in the steps S52 and S53 has a minimum value of the previously set transmission power, the current transmission power maintaining step S55 is performed for thereby maintaining a constant transmission power of the current mobile station, and if the transmission power of the mobile station decreased in the steps S52 and S53 does not have a minimum value of the previously set transmission power, the transmission power is decreased until the transmission power of the mobile station has the minimum value of the previously set transmission power of the mobile station in accordance with the control signal for thereby decreasing the transmission power by the BIG-DOWN value or the DOWN value outputted from the control unit 14.

Here, the BIG-UP value represents a value larger than the UP value, and the BIG-DOWN value represents a value larger than the DOWN value.

As described above, in the present invention, in the case that the PCB which requests a up of the transmission power of the mobile station is received from the base station, if the result value of the CRC with respect to the communication frame of the forward link is good, the transmission power is increased by the UP value, and if the CRC result value is bad, the transmission power is increased by the previously set BIG-UP value, and in the case that the PCB which requests a down of the transmission power of the mobile station is received from the base station, if the CRC result value with respect to the communication frame of the forward link is good, the transmission power is decreased by the BIG-DOWN value, and if the CRC result value is bad, the transmission power is decreased by the previously set DOWN value, so that it is possible to effectively perform the backward closed loop power control.

In addition, since the backward closed loop power control is dynamically performed, it is possible to efficiently use the power which is a basic power resource of the mobile station.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A backward closed loop power control apparatus for a mobile communication system, comprising:
   a demodulation and PCB extraction unit for receiving a communication frame transmitted from a base station, demodulating the received communication frame and extracting a PCB having an allocated transmission power up or down instruction information;
   a CRC checking unit for checking a CRC with respect to the communication frame transmitted from the base station;
   a control unit for outputting a transmission power up or down control signal in accordance with a PCB extracted by the demodulation and PCB extraction unit and a CRC result value checked by the CRC checking unit; and
   a power adjusting unit for increasing the transmission power of the mobile station to the maximum value of the transmission power and decreasing the transmission power of the mobile station to the minimum value of the transmission power in accordance with a transmission power up or down control signal outputted from the controller.

2. The apparatus of claim 1, wherein said control unit outputs, to the power adjusting unit, a control signal for increasing the transmission power to the maximum value of a previously set transmission power by a previously set UP value in the case that the value of the PCB extracted by the demodulation and PCB extraction unit is a transmission power up instruction information, and the CRC result value checked by the CRC checking unit is good, and outputs, to the power adjusting unit, a control signal for increasing the transmission power to the maximum value of the previously set transmission power by the previously set BIG-UP value in the case that the value of the PCB extracted by the demodulation and PCB extraction unit is a transmission power up instruction information, and the CRC result value checked by the CRC checking unit is bad, and outputs, to the power adjusting unit, a control signal for decreasing the transmission power to the minimum value of the previously set transmission power by the BIG-DOWN value in the case that the value of the PCB extracted by the demodulation and PCB extraction unit is a transmission power down instruction information, and the CRC result value checked by the CRC checking unit is good; and outputs, to the power adjusting unit, a control signal for decreasing the transmission power to the minimum value of the previously set minimum value by the previously set DOWN value in the case that the value of the PCB extracted by the demodulation and PCB extraction unit is a transmission power down instruction information, and the CRC result value checked by the CRC checking unit is bad.

3. The apparatus of claim 1, wherein said transmission power up instruction information is "0", and the transmission power down instruction information is "1".

4. The apparatus of claim 1, wherein in the case that the result of the CRC checking unit is good, the CRC result value is "1", and in the case of the bad value, the CRC result value is "0".

5. The apparatus of claim 2, wherein said BIG-UP value is larger than the UP value, and the BIG-DOWN value is larger than the DOWN value.

6. In a backward closed loop power control method of a mobile station in a CDMA mobile communication system for controlling a transmission power of a mobile station in accordance with a transmission power up or down instruction of a base station, a backward closed loop power control method for a mobile communication system, comprising:
   a communication frame receiving step in which the mobile station receives a communication frame including a PCB having an allocated transmission power up or down instruction information;
   a PCB extraction step for demodulating a communication frame received in the communication frame receiving step and extracting the PCB;
   a CRC checking step for checking the CRC with respect to the communication frame received in the communication frame receiving step after the PCB extraction step; and
   a transmission power control step for increasing or decreasing the transmission power of the mobile station by a previously set value based on the value of the PCB extracted in the PCB extraction step and the CRC result value checked in the CRC checking step.

7. The method of claim 6, wherein said transmission power control step includes:
   a UP value unit transmission power up step for increasing the transmission power by a previously set UP value in the case that the value of the PCB extracted in the PCB extraction step is a up instruction information, and the CRC result value checked in the CRC checking step is good;

a BIG-UP value unit transmission power up step for increasing the transmission power to a previously set BIG-UP value in the case that the value of the PCB extracted in the PCB extraction step is a up instruction information, and the CRC result value checked in the CRC checking step is bad;

a BIG-DOWN value unit transmission power down step for decreasing the transmission power to a previously set BIG-DOWN value in the case that the value of the PCB extracted in the PCB extraction step is a transmission power down instruction information, and the CRC result value checked in the CRC checking step is good; and a DOWN value unit transmission power down step for decreasing the transmission power to a previously set DOWN value in the case that the value of the PCB extracted in the PCB extraction step is a transmission power down instruction information, and the CRC result value checked in the CRC checking step is bad.

8. The method of claim 7, further comprising:

a transmission power maximum value comparison step for judging whether the transmission power of the mobile station increased in the UP value or BIG-UP value unit transmission power up step has a maximum value of a previously set transmission power;

a current transmission power maintaining step for constantly maintaining the current mobile station transmission power when the transmission power of the mobile station increased in the UP value or BIG-UP value unit transmission power up step has a maximum value of the previously set transmission power as a result of the comparison of the maximum value comparison step of the transmission power; and a transmission power up step for increasing the transmission power of the mobile station by the UP value or the BIG-UP value until the transmission power of the mobile station has a maximum value of the previously set transmission power when the transmission power of the mobile station increased in the UP value or BIG-UP value unit transmission power up step does not have the maximum value of the previously set transmission power.

9. The method of claim 7, further comprising:

a minimum value comparison step for judging whether the transmission power of the mobile station decreased in the BIG-DOWN value or DOWN unit transmission power down step has a minimum value of a previously set transmission power;

a current transmission power maintaining step for constantly maintaining the transmission power of the current mobile station when the transmission power of the mobile station decreased in the BIG-DOWN value or DOWN value unit transmission power down step has the minimum value of the previously set transmission power as a result of the minimum value comparison step of the transmission power; and a transmission power down step for decreasing the transmission power of the mobile station by the BIG-DOWN value or DOWN value until the transmission power of the mobile station has a minimum value of the previously set transmission power in the case that the transmission power of the mobile station increased in the BIG-DOWN value or DOWN value unit transmission power down step does not have the minimum value of the previously set transmission power.

10. The method of claim 6, wherein said transmission power up instruction information is "0", and the transmission power down instruction information is "1".

11. The method of claim 6, wherein said the CRC result value of the good, result of the CRC checking step is "1", and the CRC result value of the bad result is "0".

12. The method of claim 7, wherein said BIG-UP value is larger than the UP value, and the BIG-DOWN value is larger than the DOWN value.

* * * * *